(12) United States Patent
Aldridge (10) Patent No.: US 7,376,601 B1
(45) Date of Patent: May 20, 2008

(54) SYSTEM AND METHOD FOR DETERMINING SELL-THROUGH TIME AND INVENTORY AGING FOR RETAIL PRODUCTS

(75) Inventor: Bruce E. Aldridge, Oceanside, CA (US)

(73) Assignee: Teradata US, Inc., Miamisburg, OH (US)

( * ) Notice: Subject to any disclaimer, the term of this patent is extended or adjusted under 35 U.S.C. 154(b) by 307 days.

(21) Appl. No.: 10/920,667

(22) Filed: Aug. 18, 2004

(51) Int. Cl.
   *G06Q 10/00* (2006.01)
(52) U.S. Cl. .......................................... 705/28; 705/26
(58) Field of Classification Search ................ 705/26, 705/27, 28
   See application file for complete search history.

(56) References Cited

U.S. PATENT DOCUMENTS

| | | | | |
|---|---|---|---|---|
| 4,951,308 | A * | 8/1990 | Bishop et al. | 379/91.01 |
| 6,901,304 | B2 * | 5/2005 | Swan et al. | 700/115 |
| 2002/0143669 | A1 * | 10/2002 | Scheer | 705/28 |
| 2002/0161674 | A1 * | 10/2002 | Scheer | 705/28 |
| 2003/0083947 | A1 * | 5/2003 | Hoffman et al. | 705/28 |
| 2003/0172007 | A1 * | 9/2003 | Helmolt et al. | 705/28 |
| 2003/0204450 | A1 * | 10/2003 | Heinrichs et al. | 705/28 |
| 2005/0043978 | A1 * | 2/2005 | Chainer et al. | 705/7 |
| 2005/0177435 | A1 * | 8/2005 | Lidow | 705/22 |
| 2005/0192816 | A1 * | 9/2005 | Wechsel | 705/1 |
| 2005/0283394 | A1 * | 12/2005 | McGloin et al. | 705/10 |

OTHER PUBLICATIONS

Amy Zeng, Achieving information integration in supply chain management through B2B e-hubs: concepts and analysis, Industrial Management + Data Systems, Wembley, 2003, vol. 103, Issue 8/9, 9 pages.*

* cited by examiner

*Primary Examiner*—Jeffrey A. Smith
*Assistant Examiner*—Jason B. Dunham
(74) *Attorney, Agent, or Firm*—James M. Stover (57) ABSTRACT

A method and system for determining shelf life and sell-through time for retail products. The solution employs a data warehouse, a self monitoring product and product traceability. The data warehouse is utilized to track delivery information throughout the supply chain, e.g., time, quantity, product information, traceability; return information of unsold inventory returned from a retailer or customer as saleable; return information of inventory returned as unsaleable, damaged or defective; and data relating to evaluation of returned inventory. A self monitoring product is one that is capable of recording events such as number of times the product has been used, time since initial use, cumulative time and other items of interest such as stress variables, dates, min/max values, updates, etc. The solution involves evaluation of all returned product and comparing the information on the self monitoring product with known information from the supply line and return results contained in the database. The returns effectively act as a sample of all products and provide information about the product shelf-life, use profiles, installation issues, abuse, defects, etc.

2 Claims, 6 Drawing Sheets

RETAILER/OEM RETURNS

|  | NO USE | LITTLE USE |
|---|---|---|
| NO PRODUCT DEFECT | Evaluation of the data proceeds by observing the range, central values and variability of return distributions. Results represent a worst case shelf life consistent with excess and obsolete inventory. This information can be used to evaluate inventory trends and improve return procedures for different retailers. (Case 1) | In general, returns of this type originate with the customer (except for known demo product) -- whether the actual returns were made through the retailer/oem or not. Data from this class provides additional verification of sell through time to the final customer. (Case 3) |
| PRODUCT DEFECTIVE | In addition to providing sell through time information, returns in this category also imply product abuse or handling issues. These can be correlated with the type of defect observed and evaluated. This category is a good indication of time between delivery and stock as it would be expected that the damage would be noticed prior to offering the product for sale. (Case 2) | This indicates one of 2 possible issues: (1) The product was "weak" and experienced early failures, or (2) The product was misused or abused. (Case 4) |

FIG. 7

CUSTOMER RETURNS

| | NO USE | LITTLE USE |
|---|---|---|
| NO PRODUCT DEFECT | Customer returns without any usage indicate a change in the customer's mind possibly related to misunderstanding, difficult installation, higher cost than competition, etc. Typically these returns could go through the retail/OEM channel and be handled accordingly. When combined with the retail returns, information about average customer installation time is obtainable. (Case 1) | In general, returns of this type originate with the customer (except for known demo product) -- whether the actual returns were made through the retailer/oem or not. Data from this class provides additional verification of sell through time to the final customer. (Case 3) |
| PRODUCT DEFECTIVE | Returns in this category suggest improper installation or abuse by the customer. These returns provide valuable information on sell through times while also identifying possible issues with handling or installation. (Case 2) | This indicates one of 2 possible issues: (1) The product was "weak" and experienced early failures, or (2) The product was misused or abused. (Case 4) |

SYSTEM AND METHOD FOR DETERMINING SELL-THROUGH TIME AND INVENTORY AGING FOR RETAIL PRODUCTS

FIELD OF THE INVENTION

This invention relates in general to systems for managing and evaluating supply chain product flows, and in particular, to a system and method for evaluating sell-through time and inventory aging for retail products.

BACKGROUND OF THE INVENTION

A "supply chain" refers to a chain of entities, paths, and other points across which a raw material, part, or product is processed, transferred, and/or otherwise manipulated. Typically, the supply chain for a business enterprise includes suppliers, manufacturing centers, warehouses, distribution centers, and retail outlets. Efficient and cost-effective supply chain management requires controlling the flow and storage of raw materials, work-in-process inventory and finished products within and between various facilities. The goal of a properly managed supply chain is to allow merchandise to be produced and distributed in the right quantities, to the right locations and at the right time, while minimizing system-wide costs in order to satisfying customer service expectations.

Advances in data warehousing provide the ability to store detailed event information across all aspects of the supply chain. Properly correlating and analyzing this data can result in improved customer service without increased costs and inventory—effectively trading information for inventory.

Teradata, a division of NCR Corporation, has developed a suite of analytical applications, referred to as Teradata Supply Chain Intelligence (SCI), to assist manufacturing, retail and transportation companies striving to create efficient flows of new and existing, cost-effective products. The solution helps address several critical challenges facing the retail industry, including product out-of-stocks, inventory turns, security and transportation efficiency.

Figure 1:
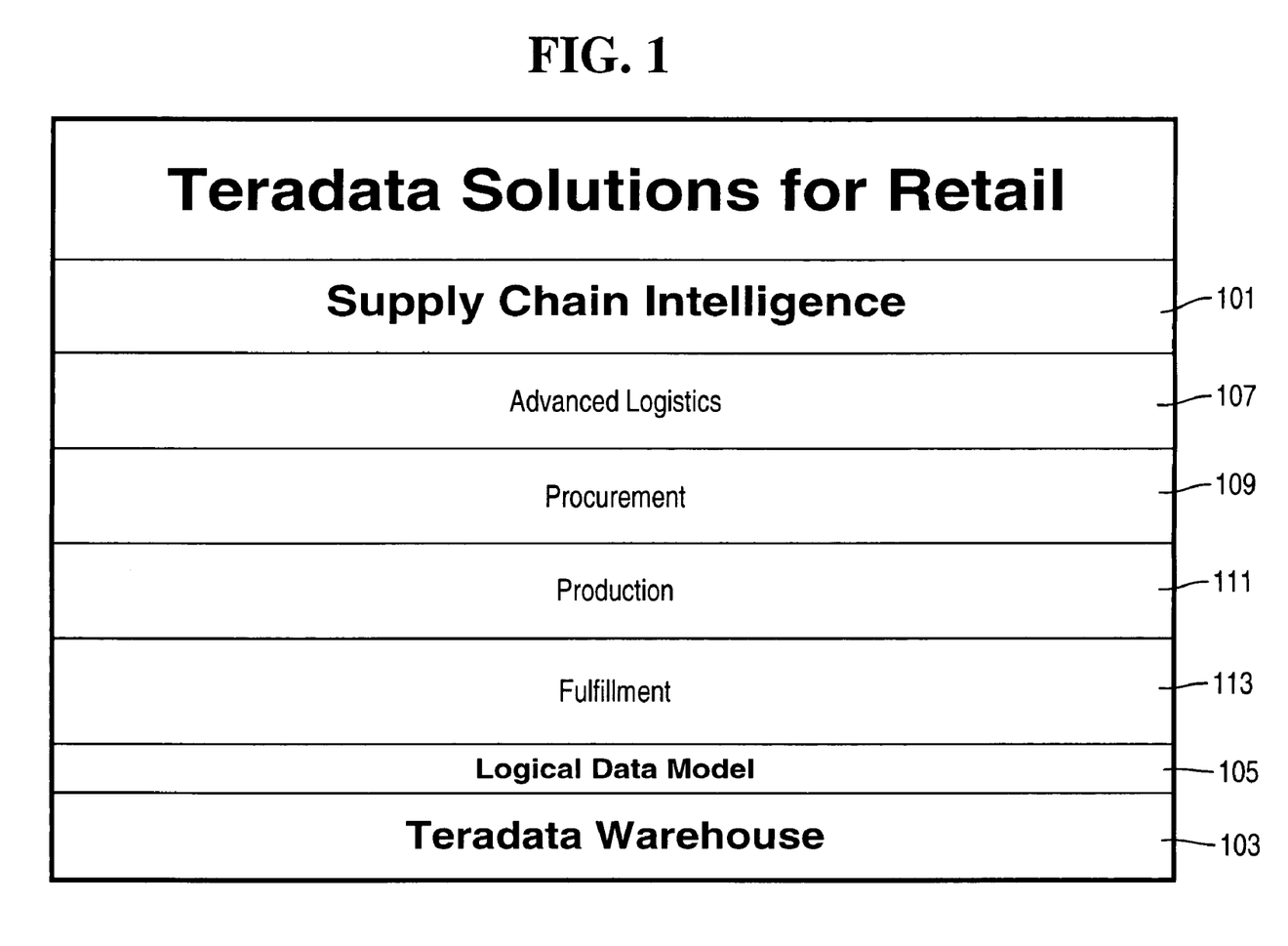
FIG. 1 provides an illustration of a supply chain intelligence software application suite for the retail industries built upon NCR Corporation's Teradata Data Warehouse.

As illustrated in FIG. 1, the Teradata Supply Chain Intelligence analytical application suite 101 is shown to be part of a data warehouse solution built upon NCR Corporation's Teradata Data Warehouse 103, using a Teradata Supply Chain Logical Data Model (LDM) 105. The Teradata Data Warehouse 103 provides a framework for tracking and reporting on extremely complex product flows associated with manufacturing and supply chain.

The Teradata Supply Chain Intelligence application suite 103 includes four key components: Procurement application 109, Production application 111, Logistics application 107 and Fulfillment application 113. Procurement application 109 is utilized to optimize purchasing efforts by evaluating global sourcing strategies and managing the most effective supplier base. Production application 111 provides managers and executives with the ability to measure and improve the way they convert the factors of production, e.g., raw materials, labor and capacity, into finished goods. Fulfillment application 113 is used to optimize customer service levels and margins through predictive inventory analysis and profitability management. Advanced Logistics application 107 provides the ability to link and manage transportation, inventories, and logistic operations across your extended supply chain.

Although integration of a data warehouse into a supply chain provides many benefits, the availability of data is typically limited to entities that are under the control of the organization or willing to cooperate. Providing the best product and customer service requires an understanding of information that may not be directly obtainable.

Figure 2:
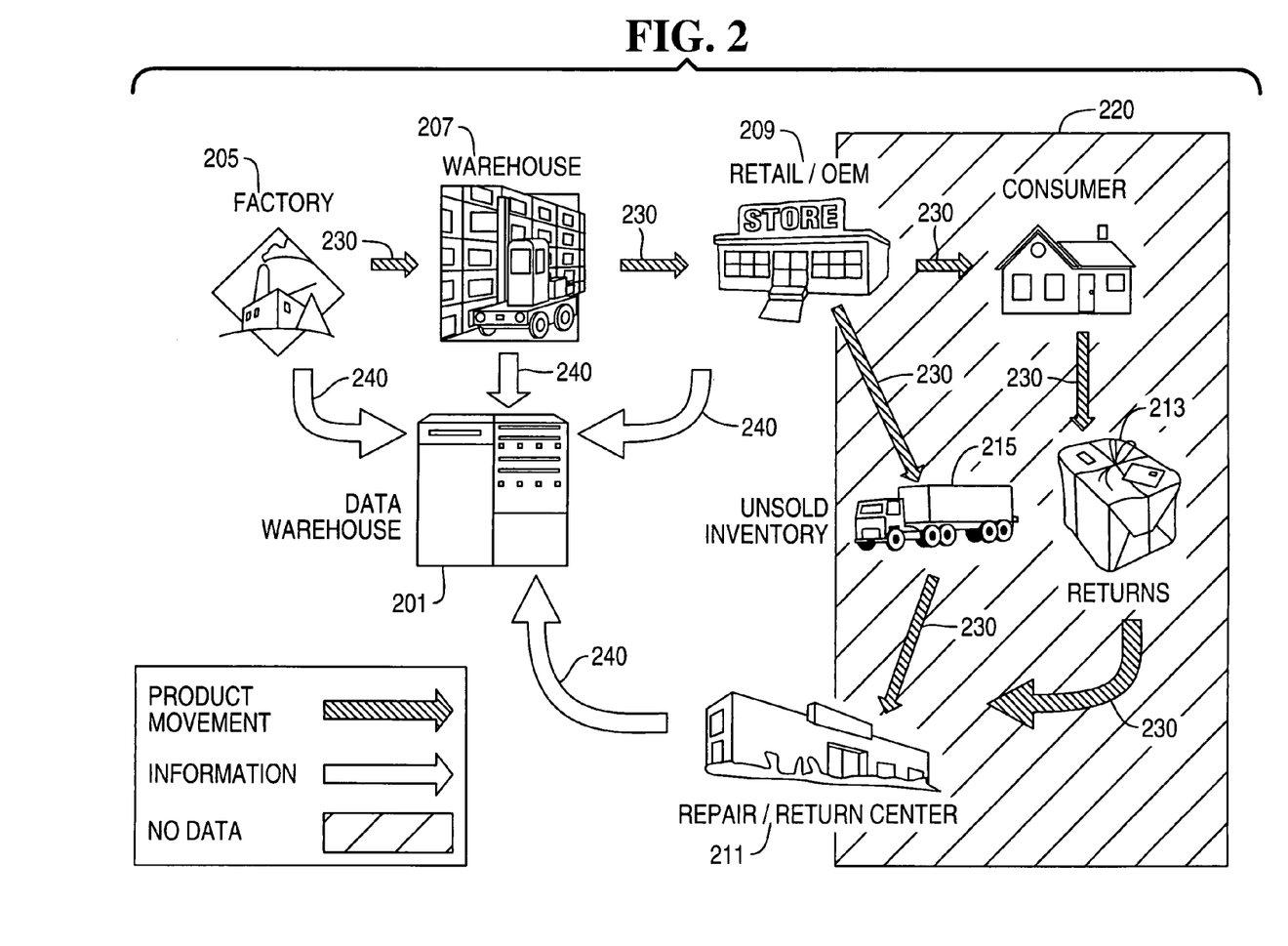
FIG. 2 illustrates a simplified supply chain integrated with a data warehouse.

FIG. 2 illustrates a simplified supply chain integrated with a data warehouse. Product movements are represented by arrows 230 and information transmissions are shown by arrows 240. Product moves through the supply chain from suppliers/factory 203 to warehouse 205 and retail centers (or OEM distributors) 209 to consumers 211. Also shown are return/repair centers 217 which receive unsold inventory 213 from retail centers 209 and return product 215 from consumers 211. In this example, factory 205, warehouse 207 and retail centers 209 and return centers 217 are all linked via a data warehouse 201. The area contained in box 220 represents information that is generally not made available to the warehouse. Note that this may include parts of retail centers 209 and return centers 217.

Frequently, supply chain analysis ends at the last available data collection point—generally with a retail or OEM delivery. Once a product is at the retail level, the amount of information available to a data warehouse varies with the sophistication of the retailer. While point-of-sale information is becoming more accessible, it is not always available to the supply chain integrator, often because of privacy or competitive advantage issues.

When the product reaches the consumer, there is generally little data available to the data warehouse. Registration and customer service requests provide, at best, limited information.

The supply chain integration needs to provide more accurate evaluations of use profiles and product distribution at the end customer. Customer returns and rejects are beset with uncertainties. Some of the questions difficult to answer once a product leaves the control of the manufacturer or retailer include:

'Was the product defective prior to purchase'—suggesting quality control, handling and/or storage issues?

'Was the product properly installed and failed after use—or was there an installation issue?'

'Is there evidence of customer fraud—was a used product returned as new?'

'Was the product used for a reasonable amount of time?'

'What is the typical time between purchase and use of the product?'

'What is a typical use profile?'

Providing data to support answering these questions will help the manufacturer/supply chain manager evaluate current policies, product documentation, returns, etc. and improve overall customer satisfaction.

Additionally, many products may have limited shelf life or other specific inventory requirements. Also, many products may be returned as defective when in reality handling and/or storage issues are to blame. The data to address these issues is typically not available as a direct feed to the data warehouse.

Supply Chain optimization is always based on a balance of demand patterns against inventory levels and production/shipments, with a goal to maximize customer service while minimizing inventory and costs. Unfortunately, demand signals tend to be provided only at the retail/OEM level, and not actual customer demand. Direct observation of customer demand is difficult to obtain, but evaluation of inventory shelf life can provide an indicator of demand changes.

SUMMARY OF THE INVENTION

In general, a method and system is provided to determine shelf life and sell-through time for retail products. The method includes the steps of including a self-monitoring feature within the retail products, the self-monitoring feature indicating use of the retail products provided from a supplier to a retail store; maintaining a database including information concerning the date the retail products are provided from the supplier to the retail store; updating the database with information concerning the date store returned ones of the retail products are returned from the retail store to the supplier; and examining the self-monitoring feature within the store returned ones of the retail products to determine whether the returned ones of said retail products have been used. Retail product shelf life is determined from the date the retail products are provided from the supplier to the retail store and the date the store returned ones of the retail products are returned from the retail store to the supplier, for the store returned ones of the retail products that have not been used.

Including data concerning customer returned retail products and returned retail product defects within the database allows for the determination of customer installation time, identification of possible handling and installation problems, and identification of possible customer misuse and fraud.

Although the embodiment described herein is applied to the sale of retail products, the techniques disclosed can also be used in service and repair industries, e.g. automotive, aviation, or equipment service and repair.

Other or alternative embodiments will become more apparent from the following description, from the drawings, and from the claims.

DETAILED DESCRIPTION OF THE INVENTION

In the following description, numerous details are set forth to provide an understanding of the present invention. However, it will be understood by those skilled in the art that the present invention may be practiced without these details and that numerous variations or modifications from the described embodiments are possible.

As discussed above, retail supply chain channels are frequently plagued by the lack of specific information associated with the end customer. An understanding of the expected time between the end of the supply chain and actual use by the end customer can be critical information in terms of warranties, recalls, customer service, inventory aging, support and reverse logistics. This is especially critical for product lines which change frequently (e.g., hi-tech) or have limited shelf life. The system and method described below also provides a methodology for discriminating against product damaged during shipment or installation and product failing in actual use.

Sell through time, as discussed herein, is the time between the last data collection point of the supply chain (e.g., delivery to retailer) and the actual use of the product by the end consumer. Defined as such, sell through time includes inventory holding/aging times, selling and transportation to the customers point of use and installation/setup (if any) by the customer. The system and method described herein estimates sell through time based on information logged by the product itself (e.g., computers, telephones, automobiles, etc) and provides a methodology for organizations to indirectly (and non-invasively) monitor times between known manufacturing and distribution channels and the actual use by the end customer. Statistical distributions are applied to the data to provide expected times and identify limits as well as statistically identify product damaged during shipment or installation.

The solution described herein requires a data warehouse, a self monitoring product and product traceability. A data warehouse is essential to provide many of the key elements necessary to solving these problems. These elements include:

Delivery information throughout the supply chain (time, quantity, product information, traceability if available). Specifically the end point information (i.e., retailer) must be available.

Return information (if any) of unsold inventory returned from retailer or customer as saleable.

Return information of inventory returned as unsaleable, damaged or defective.

Data relating to evaluation of returned inventory (i.e., test information, self monitoring information).

A self monitoring product is one that is capable of recording certain events, such as number of times the product has been used, time since initial use, cumulative time and other items of interest such as stress variables, dates, min/max values, updates, etc. This type of product—typically hi tech products—includes counters and memory to monitor product use and abuse. Many products today include such self monitoring such as computers, disk drives and automobiles. While the types of measurements available vary widely, these measures typically include, but are not limited to:

Total use hours

Number of times powered on

Dates/times

Parameters while in use (e.g., speed, pressures, temperatures, shock, etc.)

Self test information

Maintenance records

Out of spec performance

Etc.

Traceability requirements imply that the data warehouse is able to link the returned product with specific supply side information (e.g., ship or delivery time, product configuration, manufacturing issues, retail/OEM customer, etc.).

The solution involves evaluation of all returned product and comparing the information on the self monitoring product with known information from the supply line and return results. The returns effectively act as a sample of all products and provide information about the product shelf life, use profiles, installation issues, abuse, defects, etc. While additional methodologies may be derived for specific business problems, this document outlines several general methods, identified as Case 1 through Case 5, as follows.

Case 1

The self monitoring product shows no evidence of use (i.e., zero power-ons or zero power-on hours) and the product is saleable (tests good).

Figure 3:
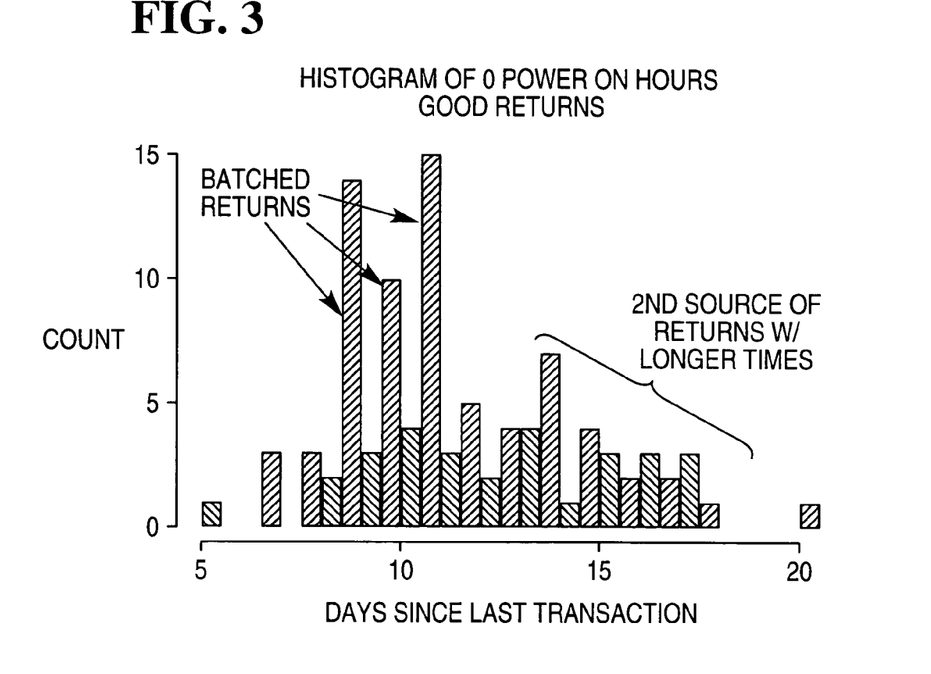
FIG. 3 is a histogram which illustrates a pattern of returns for an example product.

This would be the expected case (no use) for excess and obsolete inventory returned from a retailer or OEM. Using the data warehouse to identify these items and measuring the time between the last delivery and return provides a characterization of shelf time. The histogram of FIG. 3 illustrates the pattern of returns for an example product. Note the batching of returns near day 10, as expected from a retailer. Also note a bimodal distribution characterizing separate sources.

Evaluation of the data proceeds by observing the range, central values (mean or median) and variability of the distributions. The results in this case represent a worst case shelf life consistent with excess and obsolete inventory. This information can be used to evaluate inventory trends and improve return procedures for different retailers.

Figure 4:
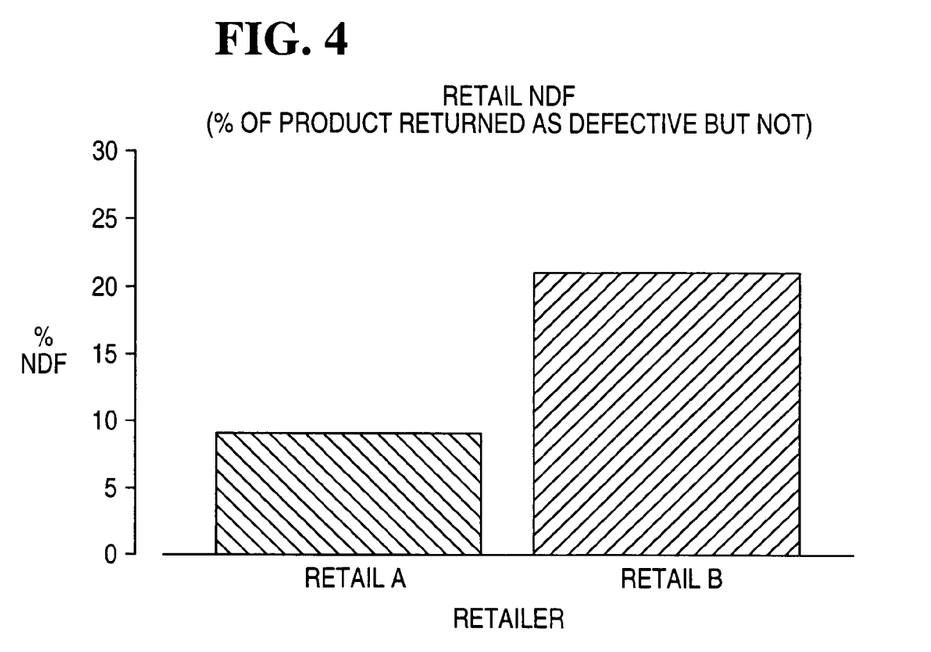
FIG. 4 is graph showing fraction of product from two retailers returned as defective wherein no detect is present.

Alternatively, if the product is returned as defective, yet the product tests good, this would indicate a problem with the retailer/OEM's procedures. FIG. 4 shows the fraction of product from two retailers returned as defective that actually meets all criteria. This data provides valuable information about the retailer or OEMs verification procedures.

This data also can provide a more consistent check on shelf life as the product is more representative of active inventory (i.e., not excess or obsolete).

Customer returns without any usage would indicate a change in the customer's mind possibly related to misunderstanding, difficult installation, higher cost than competition, etc. Note that typically these returns could go through the retail/OEM channel and be handled as outlined above. They are generally distinguishable from excess and obsolete product however (packaging damage, return flags).

The data from the units are handled as before, but when combined with the retail returns, information about average customer installation time is obtainable. An example of the difference between retail returns and customer returns are illustrated in FIG. 5.

Note the minimum values of approximately 2 days. This is generally attributable to the return procedures and can be subtracted from the analysis.

Figure 5:
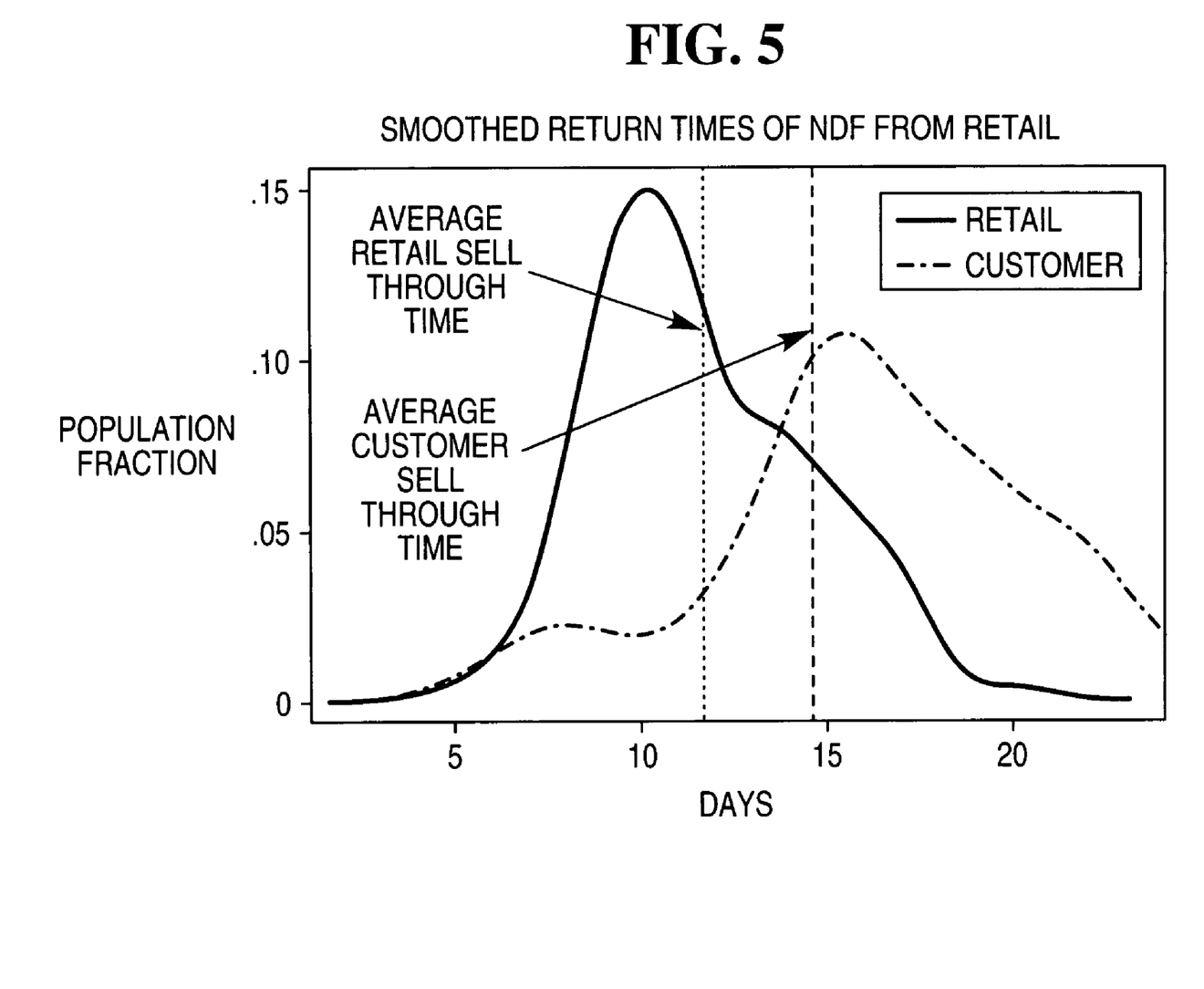
FIG. 5 is a graph illustrating product return times from retailers and customers.

Analysis of the data in FIG. 5 indicates that the expected shelf life is approximately 12 days for this product with an additional 3 days on average between when the customer purchases the item and when the customer attempted to use the item.

Customer returns that are thought to be defective, but are not, indicate installation or improper application of the product. These issues help the manufacturer to better identify and market the product.

Case 2

The self monitoring product shows no evidence of use (i.e., zero power-ons or zero power-on hours) and the product is defective.

For returns from retail centers, in addition to providing sell through time information, returns in this category also imply product abuse, quality or handling issues. These can be correlated with the type of defect observed and evaluated. This category is a good indication of time between delivery and stock as it would be expected that the damage would be noticed prior to offering the product for sale. (As before, the sell through time should be compensated for whether the return originated with the customer or retailer).

Returns from customers in this category suggest improper installation or abuse by the customer. Again, these returns provide valuable information on sell through times (as previously described) while also identifying possible issues with handling or installation. As these costs are frequently absorbed by manufacturer, an understanding of the issue can help profitability.

Case 3

The self monitoring product shows small use times (or power-ons) and the product is good.

In general all returns of this type should have originated with the customer (except for known demo product)—whether the actual returns were made through the retailer/oem or not. Data from this class provides additional verification of sell through time to the final customer.

This scenario also indicates that the product did not perform up to customer expectations and analysis of the data may provide insight into the reasons.

Another alternative is fraudulent use. The product could have been used for a short time and returned—essentially equivalent to free rental of the product.

Case 4

The self monitoring product shows small use times (or power-ons) and the product is defective.

This indicates one of 2 possible issues:

(1) The product was "weak" and experienced early failure. Evaluation must be made to determine any impact on warranty reserves and any issues associated with manufacturing and handling that could result in weak product.

(2) The product was misused or abused. In this case fraud can be suspected as the product was likely not used according to specifications. Many products include additional sensors to distinguish this case (e.g., many disk drives contain shock sensors).

Case 5

The returned product has significant time and is either defective or not.

While this is of interest to reliability and warranty issues, it is of little concern to supply chain completeness as it does not typically characterize the delivery and first use of the product by the customer. It will therefore not be considered further.

Figure 6:
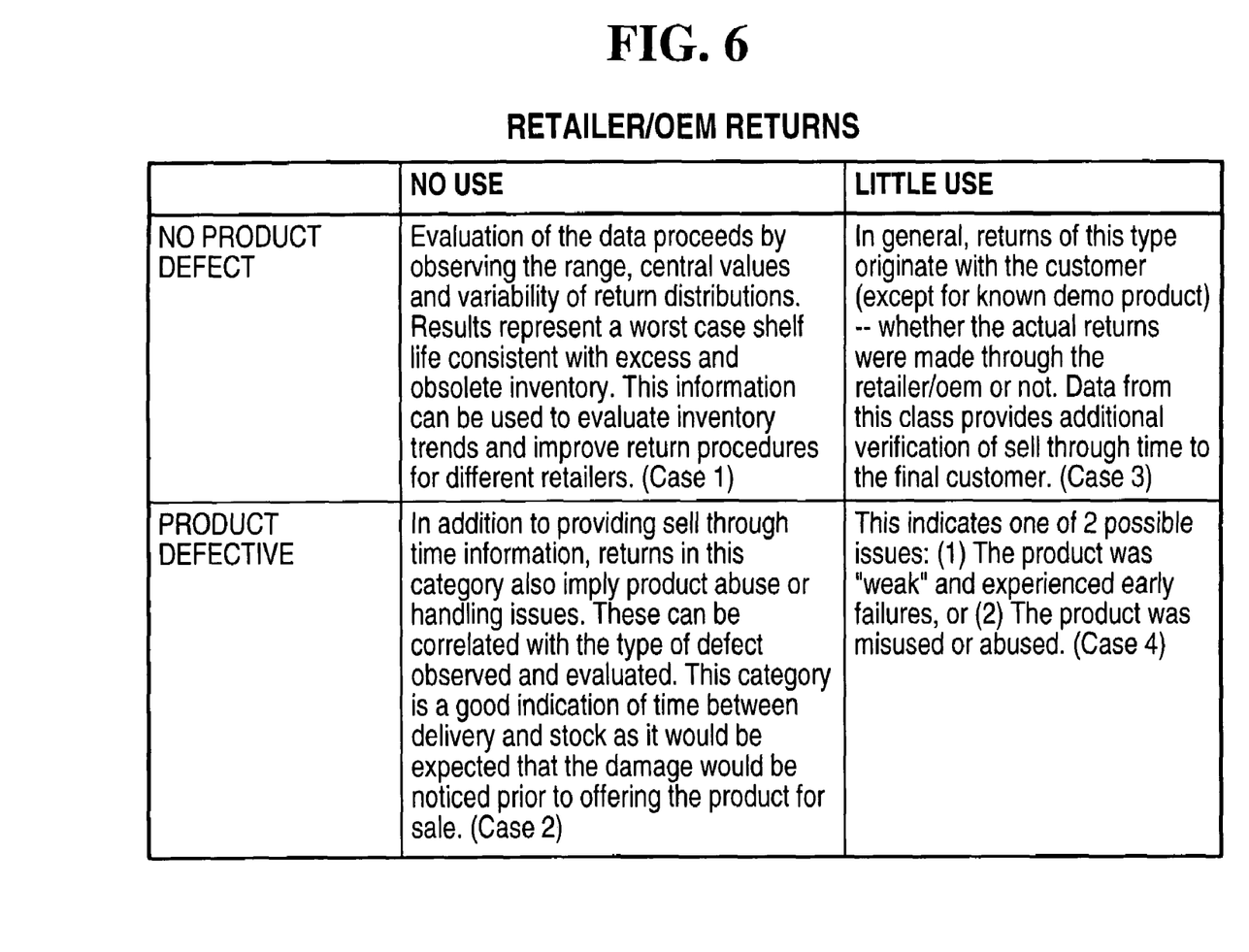
FIG. 6 is a table illustrating the process for evaluating a self-monitoring product returned from a retailer or OEM and comparing the information on the self-monitoring product with known information from the supply line and return results.
Figure 7:
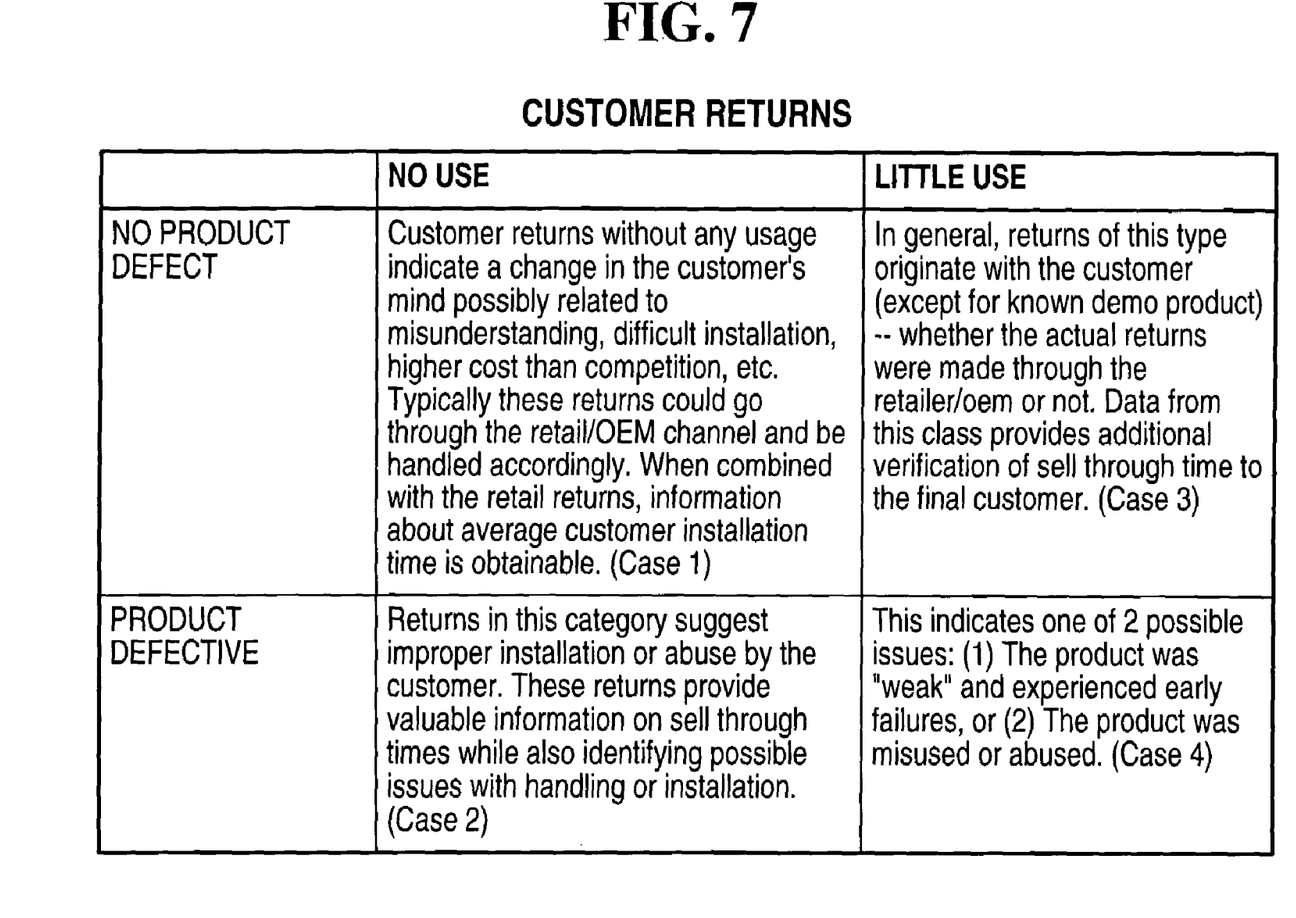
FIG. 7 is a table illustrating the process for evaluating a self-monitoring product returned from a customer and comparing the information on the self-monitoring product with known information from the supply line and return results.

The above-described methods are summarized in the tables of FIGS. 6 and 7. The table or FIG. 6 illustrates the process for evaluating a self-monitoring product returned from a retailer or OEM and comparing the information on the self-monitoring product with known information from the supply line and return results. The table of FIG. 7 illustrates the process for evaluating a self-monitoring product returned from a customer and comparing the information on the self-monitoring product with known information from the supply line and return results.

Results

With the types of analysis described above, a manufacturer/supply chain entity is able to:
   Evaluate demand signals more efficiently. Knowing sell through time and correlating with customer demand signals allows more accurate planning for product
   Provide a "correction factor" for warranty analysis. Understanding use profiles and time between purchase and $1^{st}$ use is invaluable in estimating failure rates and warranty reserves.
   Identification of fraud and abuse. Evaluation of unusual return events and product that is returned defective without ever being placed into use assists in controlling costs and preventing future losses. Similarly, identification of product "rentals" or product misuse can help clarify procedures and even provide opportunities.
   Retail/OEM inventory levels can be better optimized when shelf life, variability and sell through times are understood.
   Risk exposure. Knowing the expected times between delivery and customer use provides knowledge of risk should an issue arise forcing a recall or change in product operations.
   Complete supply chain evaluations. Knowing end point product use profiles and times can complete the supply chain analysis.

Solution Advantages

The solution is advantageous primarily because it does not require any invasive connections to other data sources. The existing supply chain data sources combined with the return information are all that is required. This information can extend supply chain information to the end customer to provide better planning, distribution and reverse logistics.

The information is also useful in extending the analysis of supply chain and distribution networks to the end customer. The methodologies described in the invention provide for identifying long sell through times or excessive shipping and installation damage. In addition, the methods:
   Provide a correction factor to warranty analysis to determine actual use times at the customer and thus provide significantly improved estimations of warranty returns.
   Identify anomalies and problem areas associated with fraud through the identification of unusual sell through times (i.e., significantly shorter or longer) and the identification of items put in use but returned as new (non zero use counter, probable installation damage).
   Assist in setting expected inventory levels by the identification of product shelf cycle times and estimation of product rotation requirements.
   Estimate risk exposure for recalls and failures by providing an estimate of product likely unsold relative to products in use by consumers.
   Evaluate inventory aging (do significant differences in aging exist by channel, location, season, etc?) and stock rotation policies (i.e., are recent shipments getting sold faster than earlier shipments—suggesting poor rotation policies)

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method for evaluating the delivery of retail products through a supply chain and retail sale, the method comprising the steps of:
   including a self-monitoring feature within said retail products, said self-monitoring feature indicating use of said retail products provided from a supplier to a retail store;
   maintaining a database including information concerning the date said retail products are provided from said supplier to said retail store;
   updating said database with information concerning the date store returned ones of said retail products are returned from said retail store to said supplier;
   examining the self-monitoring feature within said store returned ones of said retail products to determine whether said returned ones of said retail products have been used;
   determining retail product shelf life from the date said retail products are provided from said supplier to said retail store and the date said store returned ones of said retail products are returned from said retail store to said supplier, for said store returned ones of said retail products that have not been used;
   updating said database with information concerning the date customer returned ones of said retail products are returned from retail store customers who have obtained said retail products to said supplier;
   examining the self-monitoring feature within said customer returned ones of said retail products to determine whether said customer returned ones of said retail products have been used; and
   determining customer installation time for said retail products from the date said store returned ones of said retail products are returned from said retail store to said supplier and the date said customer returned ones of said retail products are returned to said supplier, for said returned ones of said retail products that have not been used.

2. A system for evaluating the delivery of retail products through a supply chain and retail sale, the system comprising:
   a self-monitoring feature included within said retail products, said self-monitoring feature indicating use of said retail products provided from a supplier to a retail store;
   a database including information concerning the date said retail products are provided from said supplier to said retail store;
   means for updating said database with information concerning the date store returned ones of said retail products are returned from said retail store to said supplier;
   means for examining the self-monitoring feature within said store returned ones of said retail products to determine whether said returned ones of said retail products have been used;
   means for determining retail product shelf life from the date said retail products are provided from said supplier to said retail store and the date said store returned ones of said retail products are returned from said retail store to said supplier, for said store returned ones of said retail products that have not been used;

means for updating said database with information concerning the date customer returned ones of said retail products are returned from retail store customers who have obtained said retail products to said supplier;

means for examining the self-monitoring feature within said customer returned ones of said retail products to determine whether said customer returned ones of said retail products have been used; and means for determining customer installation time for said retail products from the date said store returned ones of said retail products are returned from said retail store to said supplier and the date said customer returned ones of said retail products are returned to said supplier, for said returned ones of said retail products that have not been used.

\* \* \* \* \*